United States Patent [19]

Steinbiss et al.

[11] Patent Number: 4,640,681
[45] Date of Patent: Feb. 3, 1987

[54] METHOD AND APPARATUS FOR THE REMOVAL OF HARMFUL AND WASTE MATERIALS BY COMBUSTION

[75] Inventors: Eberhard Steinbiss, Cologne; Horst Herchenbach, Hennef; Albrecht Wolter, Cologne, all of Fed. Rep. of Germany

[73] Assignee: Klöckner-Humboldt-Deutz Aktiengesellschaft, Fed. Rep. of Germany

[21] Appl. No.: 771,156

[22] Filed: Aug. 30, 1985

Related U.S. Application Data

[63] Continuation of Ser. No. 644,929, Aug. 27, 1984, abandoned.

[30] Foreign Application Priority Data

Aug. 25, 1983 [DE] Fed. Rep. of Germany ....... 3330667
Apr. 21, 1984 [DE] Fed. Rep. of Germany ....... 3415211

[51] Int. Cl.⁴ .......................... F27B 15/00; F23D 1/00
[52] U.S. Cl. ...................................... 432/14; 432/106; 110/347; 106/100
[58] Field of Search .................. 110/345, 346, 347; 432/14, 106; 106/100

[56] References Cited

U.S. PATENT DOCUMENTS

| | | | |
|---|---|---|---|
| 4,236,886 | 12/1980 | Ansen et al. | 110/347 |
| 4,285,283 | 8/1981 | Lyon et al. | 110/347 |
| 4,295,823 | 10/1981 | Ogawa et al. | 432/14 |
| 4,310,298 | 1/1982 | Abelitis | 110/347 |
| 4,315,734 | 2/1982 | Ramesohl et al. | 432/106 |
| 4,363,668 | 12/1982 | Herchenbach | 432/106 |
| 4,392,353 | 7/1983 | Shibuya et al. | 432/14 |
| 4,397,248 | 8/1983 | Mehta et al. | 110/347 |
| 4,402,275 | 9/1983 | Weiner et al. | 110/347 |
| 4,420,302 | 12/1983 | Knudson | 432/14 |
| 4,462,794 | 7/1984 | Pfeffer, III et al. | 110/347 |

Primary Examiner—Henry C. Yuen
Attorney, Agent, or Firm—Hill, Van Santen, Steadman & Simpson

[57] ABSTRACT

A method and apparatus for the removal of hazardous and waste materials of low heat content, for example, refuse, by means of combustion wherein the combustion process is carried out in a furnace by the presence of added hot combustion air at a temperature sufficient so that the combustion and/or flue gas temperatures are at least 1250° C. In a preferred embodiment of the invention, the combustion process is combined with a process for the production of cement clinker and carried out parallel to the same, wherein air at about 800° C. is branched off for combustion of the hazardous substances from the cooler air of the cement clinker installation and introduced into the furnace. The hot flue gas of the combustion in the furnace is as directed into the cement clinker installation. The invention further contemplates that calcium-containing carbonate carriers can be added to the refuse.

11 Claims, 4 Drawing Figures

METHOD AND APPARATUS FOR THE REMOVAL OF HARMFUL AND WASTE MATERIALS BY COMBUSTION

This is a continuation of application Ser. No. 644,929, filed Aug. 27, 1984 now abandoned.

BACKGROUND OF THE INVENTION

1. Field of the Invention

The present invention is directed to the field of removing harmful and waste materials having low heat content, particularly refuse, by means of combustion utilizing a cementmaking plant as the source of heat and binder materials.

2. Description of the Prior Art

Harmful and waste materials such as household wastes, community wastes, agricultural wastes and industrial refuse invariably contain some combustible substances. Nearly all known methods for the removal of such refuse have serious disadvantages which have never heretofore been eliminated.

For example, in refuse composting, heavy metal compounds capable of being leached reach the biological cycle and accumulate. In some cases, there are also found harmful organic compounds and/or harmful bacteria, salmonella and other pathogenic bacteria in the compost.

Similar dangers of contamination of ground and ground water exist with a deposit of refuse. Through leaching or decomposition, such deposits can yield harmful substances, poisons, and the like which enter into the ground and ground water. Beyond this, in heavily populated areas, depositing places are not readily available, and constitute a source of annoyance for the population, and are not usable as building ground or utilitarian land even decades after the deposit has been closed up.

The removal of harmful and waste substances such as refuse accordingly constitutes a complicated problem. This holds true particularly if the waste materials are removed by means of combustion. When such materials are burned, harmful substances adversely affecting the environment are released, such, for example, as nitric oxide, compounds of sulphur, halogens, or alkalies, as well as vapors from heavy metals. Also, in many cases, the heat content of the combustible portions or exhaust gases is not utilized and is lost.

Community household refuse in many cases has to be treated in expensive refuse combustion installations. Such refuse contains, for example, combustible portions with an average heating value of 2000 to 2200 kcal/kg. Refuse combustion installations which at one time seemed to provide the answer for the refuse problem have in recent times been criticized because of their emission of harmful substances into flue gas and the production of leaching prone heavy metal residues in the flue dust or the wash water. Some of these installations therefore had to be left standing idle. In the case of ordinary grate fires in refuse combustion installations with combustion air temperatures in the area of 400 to 500° C., the firing does not reach the temperatures necessary for the reliable reduction of organic toxic compounds such as dioxin or polychlorinated diphenyl. Also, the heavy metals reaching the flue dust or the wash water are not in a leaching resistant form and accumulate to dangerous concentrations upon their deposit. Added to this is the disadvantage, in addition to the increased cost, that there is a difficulty of maintaining the combustion temperature on the grate substantially constant.

Even the pyrolysis of refuse which at one time appeared promising, brings appreciable problems. The limitation of capacity of the distillation chambers is a disadvantage. A distillation process with an air cut-off and heat supply can apparently take place solely in closed chambers in a discontinuous manner. In this connection, danger to the environment exists if, through carelessness in the conduction of the process, the vaporization temperatures exceed or fall below certain limits. In this case, the formation of dioxins through pyrolysis of chlorine-containing scraps of synthetic material is likely to occur. Just as in the case of the grate firing, the process of pyrolysis is also subject to appreciable difficulties and risks.

SUMMARY OF THE INVENTION

The present invention has as its objective the removal of hazardous and waste materials by means of combustion in such a manner that no hazardous materials affecting the environment result or are emitted, and the heat content contained in the waste materials is utilized economically and in a technically meaningful manner. The apparatus suitable for the carrying out of the present invention requires substantially less investment and operation costs as compared, for example, with ordinary refuse combustion installations. Finally, the apparatus is adapted to be economically combined with an available pyrotechnical installation such as a cement calcination installation.

In accordance with the present invention, the combustion process is carried out in a calcination apparatus utilizing a supply of hot combustion air as an energy carrier at sufficiently high temperatures so that the combustion and/or the flue gas temperatures reach at least 1250° C. The combustion of refuse makes possible during the supply of hot combustion air the attainment of a temperature range of 1250° C. even when the heat content of the hazardous and waste materials is low and even when refuse comes to the combustion zone with an appreciable moisture content.

The maintenance of the indicated temperature range is advantageous because it results in a complete decomposition of nearly all hazardous materials such as cyclic hydrocarbons or non-toxic compounds of sulphur, halogens or halides and alkalies. The maintenance of temperatures in the aforementioned range also practically prevents the thermal formation of hazardous quantities of toxic nitric oxides.

In one embodiment of the present invention, the temperature is maintained by maintaining the temperature of the combustion air in accordance with the magnitude of the heat content of the substances to be burned or according to the extent of the combustion and flue gas temperatures. This may be achieved in the case of an excessive temperature rise because of higher heating contents of the materials arriving for combustion through admixture of fresh air.

In order to be able to burn economically waste materials with low heat content as, for example, household refuse, one form of the invention provides that the combustion air is supplied at a temperature in the range between 600° C. and 950° C., preferably at about 800° C. to the calcination zone. In this connection, it was found surprisingly that the high temperature combustion sought is attained advantageously without the addition of other combustible materials and the hot combustion air is sufficient as an energy carrier in order to initiate and maintain a clean, effortless combustion process for the environment.

In order to utilize as far as possible the heat content even if low, contained in the hazardous and waste materials, as well as to eliminate toxic components without residue, one feature of the present invention resides in carrying out the combustion process with a stoichiometrically comparable portion of hot combustion air in relation to the portion of fuel or combustible material.

In a preferred embodiment of the invention because of its technical and economic advantages, the combustion process is carried out at the same time and in combination with the production and calcination of a cement clinker whereby combustion air for the combustion process of the hazardous material is branched off from the cooling zone of the clinker cooler and flue gas from the hazardous material combustion process is introduced into the system of the cement clinker manufacturing installation. With this combination, there are several advantages. For one, economically produced hot combustion air is available from the cooler which normally puts out air in the temperature range of 650° to 950° C. This temperature is sufficient in most practical cases of refuse combustion in order to attain or to maintain a combustion temperature in the calcination zone of at least 1250° C.

The cooler exhaust air is additionally charged with clinker dust which because of its temperature, its highly active surface, and its mineralogical composition possesses an optimum degree of activity for the binding of the hazardous materials.

The return of exhaust gases from the calcination process into the system makes possible additionally an economical and technically significant utilization of the heat content, for example, upon the calcination of the raw powder, in case of its preheating, or in a mill-drying installation connected in series with the cement calcination installation.

Beside the utilization of the heat content of the flue gases to the extent of approximately 70% of its heat content, the introduction of the gases into the calcinator, cyclone heat exchanger, and mill drying has the advantage that hazardous materials which are contained in the exhaust gas are bound adsorptively or chemically to the material. Consequently, the emission of these hazardous materials is to a fargoing extent or almost completely eliminated.

There is a method already known for the utilization of industrial wastes in calcination processes for the production of alkali earth oxides, silicates or aluminates in which the wastes are brought into contact with the calcination material such that they absorb the inorganic constituents of the wastes resulting upon the combustion or decomposition of the wastes. The known method provides a rotary kiln which is used for calcination, whereby the wastes are blown into the rotary conduit with a carrier air current on the kiln port or head. The wastes may also be introduced into the inlet of a clinker cooler (German Laid-Open Specification No. 26 24 971).

The known method has the disadvantage that the calcination material because of its admixture with the wastes is appreciably diminished in quality.

Substantial advantages result from the method according to the present invention for the hazard-free removal of refuse wherein carbonate carriers are added to the refuse in such quantity that the CaO content in the calcination product amounts to at least 30 weight %, whereby the refuse is converted to a calcination product with materials containing calcium carbonate at temperatures of at least 1200° C.

By combustion of the refuse with calcium-containing carbonate carriers at at least 1250° C., a complete decomposition of all organic and particularly toxic substances into oxidic, water-insoluble materials is achieved. Non-organic substances such as heavy metals are, on the other hand, bound in a leach resistant form in the slag. Consequently, the combustion product can be supplied without danger to the environment into a ground deposit without danger of a contamination of the ground or the ground water. One embodiment of the invention provides that the CaO content of the calcination product amounts to between 30% and 70%, and preferably between 40% and 55%, the additional quantity being adjusted according to the type and quantity of hazardous material to be separated from the resulting gas.

A carbonate-containing material in the form of a cloud of flue dust may be introduced into the exhaust gas according to the nature of the hazardous substances to be separated off from the gas and the exhaust gas may be accordingly purified by the cloud of hazardous materials such as $SO_2$ acting as a reactive restraining filter.

By coupling the combustion with a cement clinker calcination, utilizing air for combustion of the hazardous materials from the cooler exhaust air, and utilizing flue gas from the calcination zone in the cement clinker calcination, the disadvantages of the cement calcination process in the case of rotary kilns disappear. Consequently, there is no lessening of clinker quality and/or deterioration of heat economy. Advantageously, the introduction of flue gases occurs in the calcination zone at points where through longer durations and the presence of reactive raw material as, for example, in the calcination zone, sufficiently long reaction times favor the adsorptive or chemical binding of the hazardous materials to the cement raw powder. If according to mineralogical composition of the raw powder, there is a tendency for cyclic formation of hazardous materials, the invention may make use of a partial gas reduction such as by means of a bypass.

One embodiment of the method provides for the addition of mineralized residues of the hazardous material combustion process to the calcination material where the materials are calcined, cooled and/or ground together with the clinker. It was found in this connection that such combustion residues which contain mainly ash, slags and/or small portions of metals can be added in many cases without problems to the cement clinker and without diminishing its quality. By the development of the refuse dissipitating device with a separate closed-off calcination zone, there result not only the foregoing mentioned advantages but also the possibility of optimizing the combustion process of the waste materials and, independently thereof, the calcining process of the minerals. Through the coupling of the calcining aggregate to a source of heating gas, the ignition temperature and the ignition quality of the waste materials even of low heating value is reliably attained. Consequently, the supply of high-grade fuels as additional energy carriers previously required in many cases no longer is required.

The calcining zone may be relatively uncomplicated, particularly in the case of a vortex layer calcination zone. As a result, there may be substantial savings in investment and operational costs. Among other things, an independent recuperation system for air for combustion as well as a dissipation and/or a purification system for exhaust gas are not necessary. In addition, the addition of the calcareous carbonate carriers provides a favorable price situation without greater transportation problems. In order to supply the calcination product for use as a hydraulic binding means, according to one embodiment, a calcinating product may be melted into a glassy condition. This material can then by known means be granulated as slag and added as a hydraulically active component in the product grinding step of a cement manufacturing installation.

BRIEF DESCRIPTION OF THE DRAWINGS

In the following, the invention with its advantages will be explained in greater detail on the basis of examples of several embodiments shown in the drawings in which.

DESCRIPTION OF THE PREFERRED EMBODIMENTS

Figure 1:
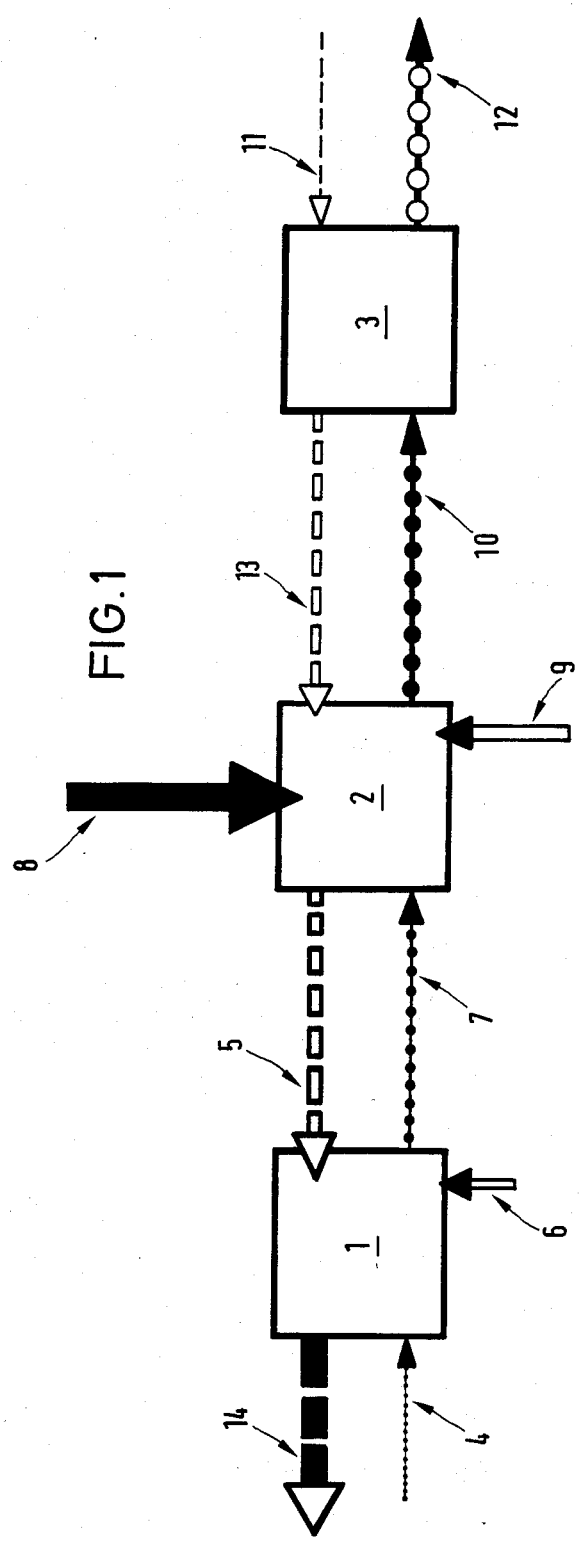
FIG. 1 illustrates a method according to the invention in the form of a block diagram including a preheating zone and calcination zone, a clinker calcination station and a cooling station.

The installation shown in FIG. 1 comprises a preheating and calcination zone 1, a calcination station 2 and a cooling station 3. To the preheating and calcination zone 1 there is applied, in powder form, a calcium-containing carbonate carrier by means of an inlet 4. This material is heated in direct heat exchange countercurrent to hot furnace gases introduced through an inlet line 5 from the calcination station 2, the material being at least partially calcined in this stage. To supply the heat requirement in connection with the endothermic process of calcination, combustibles are supplied by means of an inlet line 6. The heated and partially deacidified raw powder leaves by means of a line 7 and reaches the calcination station 2. The latter zone is also fed with refuse by means of an inlet line 8. The refuse and the deacidified raw powder are intimately mixed with each other in the calcination station 2 and, depending on need, during addition of combustibles through the inlet line 9 are calcined at temperatures above 1250° C. The refuse entering at the inlet line 8 with the calcium-containing substances are, at temperatures of 1350° C. and higher, converted to a calcination product which leaves by means of a line 10. The latter arrives from the calcination station into the cooling station 3. In this station, it is cooled with cooling air introduced by means of a line 11 and is discharged as an end product through a discharge line 12. The cooling air is heated and is introduced as hot air for combustion through a line 13 at temperatures between 800° and 1000° C. into the calcination station 2. In that station, hot combustion air, if necessary with added combustibles through the line 9, produce a high temperature refuse combustion. This results in hot furnace exhaust gases which leave through the line 5 and supply the heat requirement for the heating and deacidification of the carbonate carrier introduced through a line 4. After giving off a large part of the sensible heat and binding of entrained hazardous materials such as sulphur-dioxide in the reactive filter of the cloud of flue dust, an exhaust gas is withdrawn from a line 14 and is separated out of the process.

Figure 2:
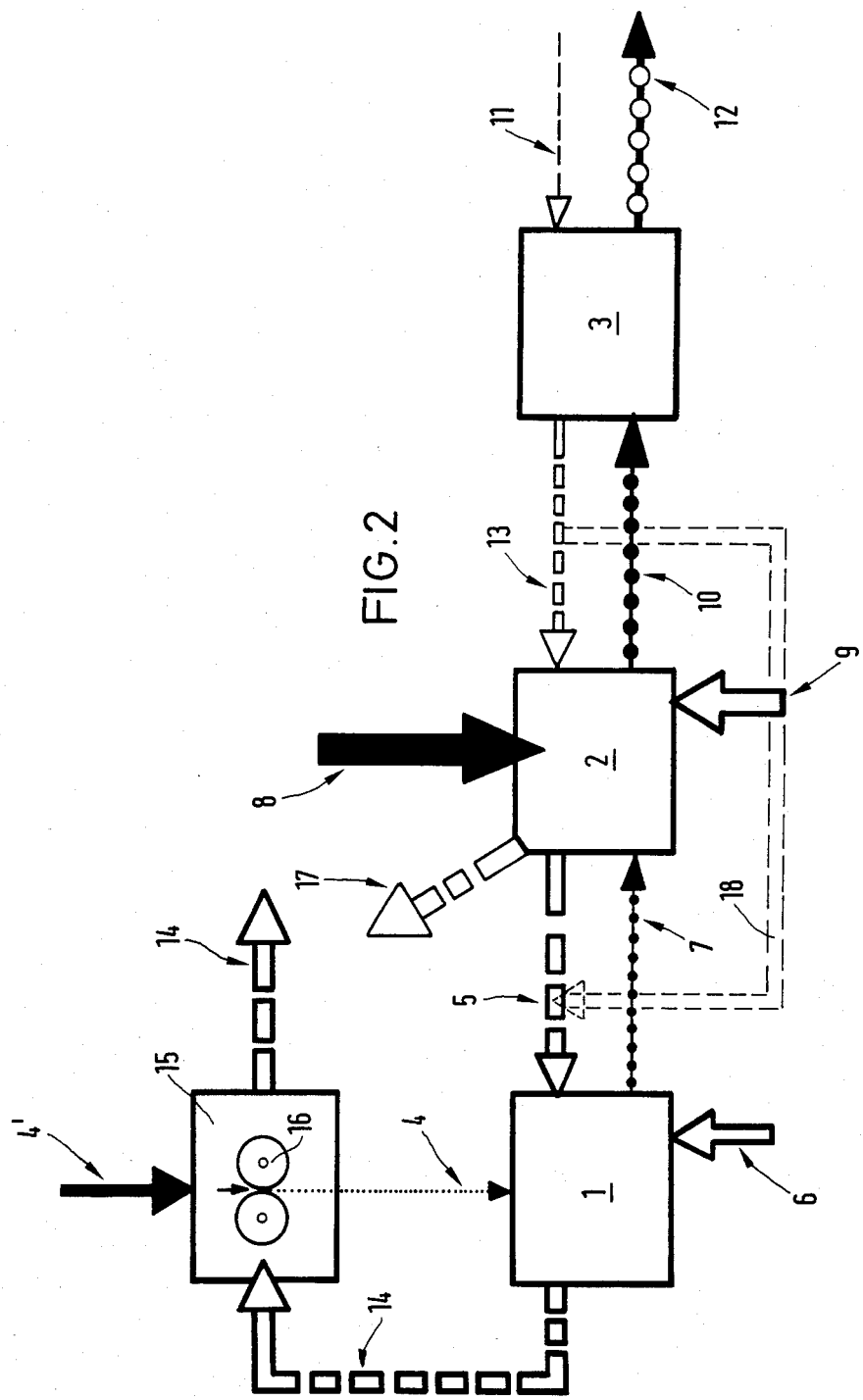
FIG. 2 is a block diagram of an installation similar to that of FIG. 1, but with a dry grinding station for the calcium containing carbonate carrier connected in series with the preheating station.

FIG. 2 shows a similar flow chart with the three fundamental zones, namely, preheating and calcination zone 1, calcination station 2, and cooling station 3. In the form of the invention shown in FIG. 2, the preheating and calcination zone 1 is connected in series with a grinding and drying station 15 for the carbonate carrier basic material entering through a line 4'. The latter is supplied freshly mined to the grinding-drying station 15 and is dried therein in a current of exhaust gas introduced by means of the line 14. It is ground to powder in a comminution device illustrated diagrammatically at reference numeral 16. In this case, the grinding and drying device for the exhaust gas functions additionally as a reactive or adsorptive filler. If residues of hazardous materials are still present in the exhaust gas, the latter may be submitted to known gas purification steps.

An appreciable reduction of hazardous materials in the gas of the method is achieved by means of a gas outlet 17 which branches off from the calcination station 2. Upon reaching process temperatures, elements which are inclined to vaporize or condense such as halogens or sulphur are driven off through the gas outlet 17 at least partially from the calcination process. Because the preheating and calcination zone 1 must, in each case, remain further operative, there is provided a bypass line 18 which draws off hot gas for combustion from the line 13 leading from the cooling station 3.

Figure 3:
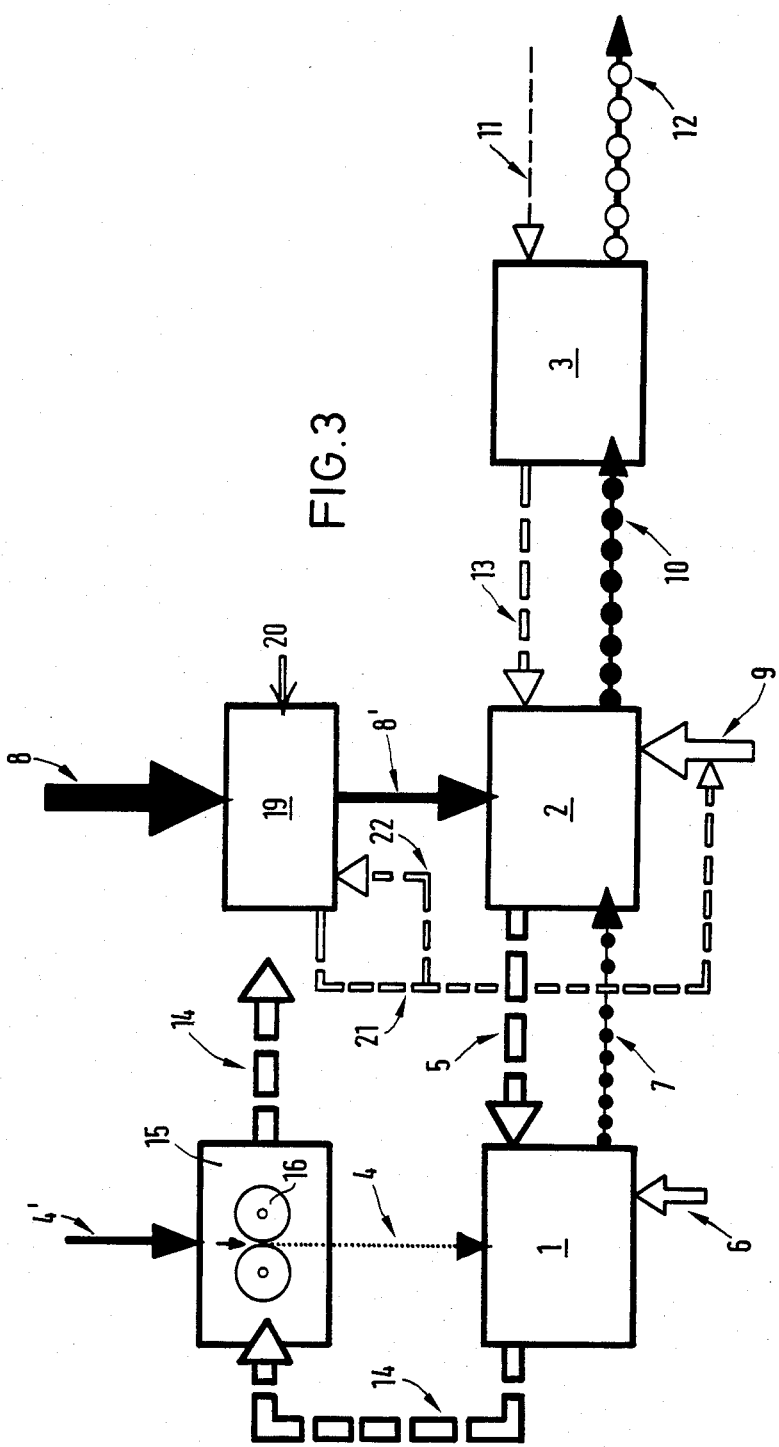
FIG. 3 is a method similar to that shown in FIG. 2, however with an additional pyrolysis station.

In FIG. 3 there is shown another form of the method according to the present invention wherein refuse is introduced through a line 8 into a pyrolysis station 19. The refuse is there subjected in a chamber in the absence of oxygen to a dry distillation with added heat. To start the process, a separate heater 20 is utilized for as long as gas from the low temperature carbonization reaction results. The gas is conveyed to the inlet of air for combustion as illustrated in inlet 9 of the calcination station 2. A branched-off partial current is removed by means of a line 22 from the low temperature carbonization and covers the heat requirement of the pyrolysis station 19. The refuse introduced by means of line 8 is introduced into the chamber during cut-off of the air and a pyrolysis residue is removed by means of a line 8' and supplied to the calcination station 2 where it is mixed with deacidified raw powder entering through an inlet 7 and calcined or sintered, respectively, as described previously.

Figure 4:
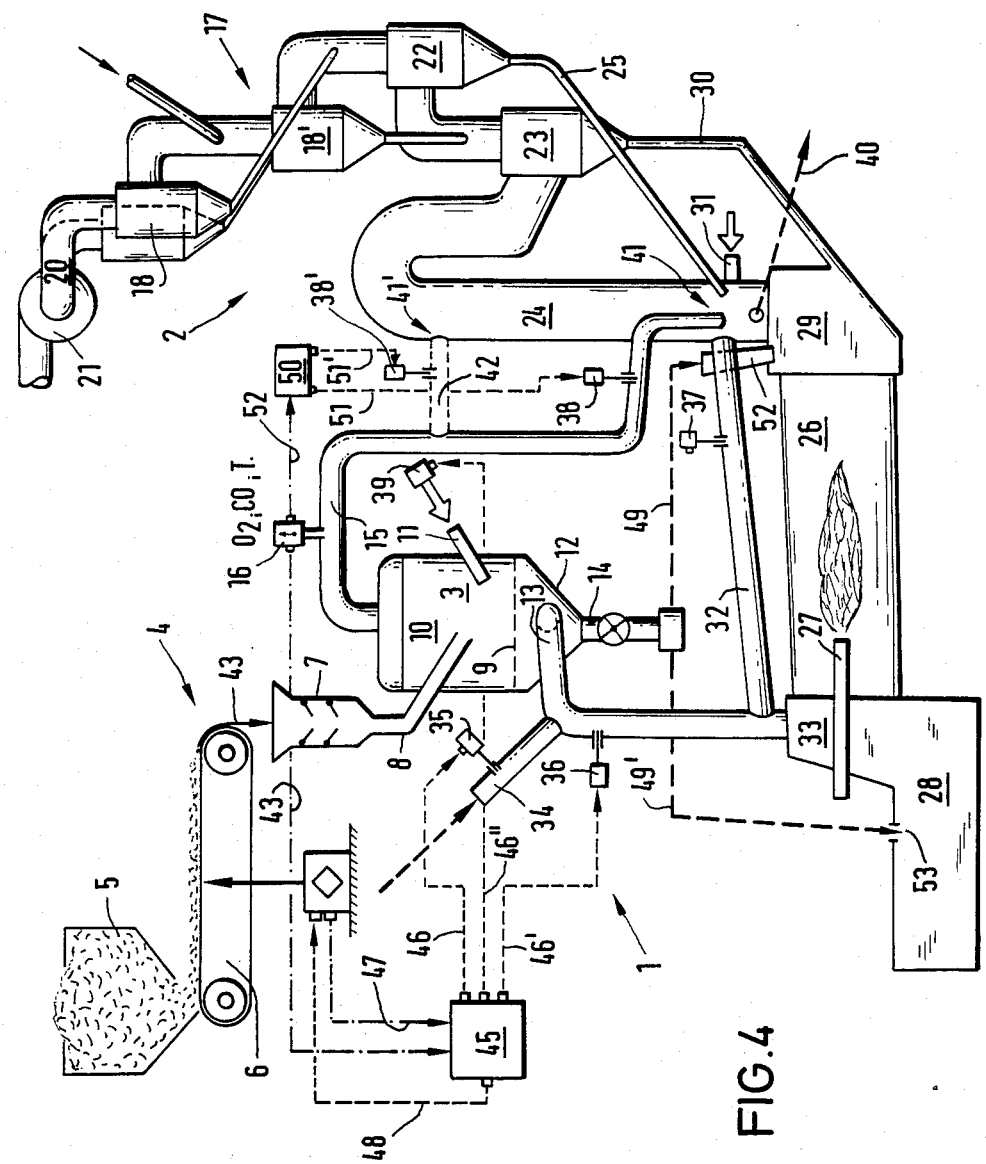
FIG. 4 shows a refuse combustion system combined with a cement calcining installation.

FIG. 4 illustrates a system 1 for removal of hazardous and waste materials integrated with a cement calcination installation 2. This system employs a self-contained furnace which may be a vortex type furnace. It may, however, also be of a different type such as a rotary kiln.

A material feeding device 4 operates in conjunction with a storage container 5 and a gravimetrically dosaged withdrawal member 6. In the form of the invention shown, this is a dynamic weighing device in the form of a continuously operating dosaging belt scale 6. The latter carries the hazardous and waste materials to be burnt as indicated by the arrow 43 through a material charging valve 7 and an inlet chute 8 into the combustion chamber 10 of the furnace 3. The materials first are deposited on a grate 9. Beneath the grate there is provided a conical floor part 12 into which is introduced the supply of air for combustion through an inlet 13. Into the combustion chamber 10 there projects an ignition and supporting burner 11 whose supply of air for combustion is adjusted by means of a regulating member 39. Leading from the gas chamber or combustion chamber 10 there is a flue gas pipe 15 in which there is arranged a measuring device 16 through which the gas composition, especially free oxygen and/or CO, as well as the temperature of the flue gas can be measured. By means of a signalling conduit 43, the measured values are superimposed on a regulating unit 45 and converted therein to control signals which by means of control conduits 46, 46' 46" influence the adjustment of throttling members 35 for fresh air, 36 for hot combustion air, and 39 for calcination material for the supplementary burner. In this manner, with a relatively low expenditure, the combustion process in the furnace 3 is controlled according to the proportion of the flue gas temperature or a presumed flue gas composition. In similar manner, as known per se, by means of a required/actual value comparison, a signalling wire 47 and a control lead or pilot is controlled by the dosaging belt scale 6.

The cement calcining installation 2 includes a preheating section 17 having cyclone heat exchangers 18, 18', 22 and 23. An exhaust gas conduit 20 discharges into an exhauster or exhaust gas blower 21 whose compressed air line leads to a chimney or flue, not shown. The cement calcining installation 2 further comprises a rotary kiln 26 with a burner 27 as well as a cooler 28 connected in series. Into the rotary kiln inlet housing 29 of the rotary kiln 26 a conduit 30 for calcined powder discharges, the latter being coupled to the lowermost heat exchange cyclone 23. Between the rotary kiln inlet housing 21 and the preheating section 17 there is arranged the precalciner 24 which is constructed as a reaction zone with an offset upper end. At the bottom end of the precalciner 24 there is a drop conduit 25 for the preheated raw powder which discharges from the cyclone heat exchanger 22. At the same height, opposite a tertiary air conduit 32, a fuel charge is injected at inlet 31. The tertiary air conduit 32 is, just as the conduit 13 of the combustion air supply for the furnace 3, equipped in each case with an adjustable throttling member 36, 37. The throttling members 36, 37 are necessary to be able to adjust a definite quantity relation between the tertiary air and the branched-off hot air for combustion. Instead of such throttling members, which can take many forms, resistances in the form of pipe conduit attenuations can also be inserted. The coupling of the system for removal or dissipation of hazardous and waste materials is such that, on the one hand, the feed of air for combustion through the inlet line 13 is connected with the furnace 3 at the hot air outlet 33 of the cooler 28 and, on the other hand, the flue gas conduit 15 from the furnace discharges at a point 4 into the precalciner 24. This has an additional advantage that between both attachment points 33 and 41, there is a drop in pressure which is sufficient in order to insure the supplying of the furnace with hot air for combustion and the withdrawal of flue gases without additional hot gas blowers. In addition, the refuse combustion device requires no separate or individual air heating device, no costly input of larger quantities of high-grade fuels, and no actual flue gas withdrawal or purification installation. Thus, there are appreciable advantages as to cost in respect of investment and operation.

In the flue gas conduit 15, there is advantageously provided a throttling member 38 which controls the adjustment of the flow speed according to the extent of quantity of material being consumed per unit of time. This throttling member 38 is attached to a regulating unit 50 through a control conduit 51. The regulating unit 50 is connected with a control conduit 32 to a measuring device 16. A regulating switch is provided so that with an excess of temperature rise in the flue gas, a throttling of the flue gas conduit takes place through the throttling member 38. In the case of an increased content of hazardous material in the flue gas which could lead to an impairment of the chemical reaction in the calcination operation, a branch conduit 42 is provided which is indicated in dotted lines and permits flue gas to flow at a more highly disposed point 41' of the calcinator into the same. At this point, the calcination reaction has progressed appreciably and because of this will not essentially be influenced by possible quantities of hazardous materials.

The device 1 for the removal of hazardous and waste materials provides further that combustion residues from the furnace 3 are introduced either into the rotary kiln 26 or into the cooler 28. For this purpose, in each case, there is a transporting device 49 or 49', respectively, connected in series with the outlet 14 at the lower end of the conical bottom part 12. Through the transporting device, combustion residues are either directed through a charging valve 52 in the rotary kiln inlet housing 29 or through an opening 53 in a central part of the cooler 28. Also, the combustion residue can have other uses such as admixture to the final cement product. Leaching-resistant residues may also be deposited.

The materials condensed in the withdrawn gas and/or the dust contained therein together with the calcined product may be treated to a leaching-resistant consistency as by means of hydration. In the case of the hazardous materials, these may be treated with a binder which prevents endangering the environment.

The consistency of the calcination product may be adjusted by hydration with or without the addition of binders. It is thereby assured that neither the residues of the combustion process, the exhaust gas, or the hazardous materials containing calcined product will have a toxic effect upon the environment.

The functioning of the two systems, one for the dissipation of waste substances and the system for the production of cement, will be explained briefly as follows.

During the operation of the cement calcination system, as long as the device 1 is still not in operation, the throttling members 36 in the calcination air feed line 13 and 38 in the flue gas conduit 36 are closed. Accordingly, the cement calcination system operates alone without any influence being exerted by the device 1 which is arranged in parallel for the dissipation of wastes. Upon beginning of operation of the waste treatment, first the two throttling members 36 and 38 are opened, a small amount at a time. Consequently, hot cooler air flows through the still empty calcination furnace 3 into the bypass for the tertiary air conduit 32 and heats up the system parts, up to then still cold. In order to accelerate the heating operation, the ignition and supporting burner 39 is ignited. As soon as the temperature in the furnace 3 reaches a level above that required for ignition with the aid of the material entering from the supply apparatus 4, the gravimetric feeding device 6 causes refuse to be drawn out of the storage bunker 5 and supplied through the charging valve 7 into the combustion chamber of the furnace 3. The material is ignited because of the high temperatures in the furnace. Then the throttling members 36 and 38 are opened further and the combustion is set fully in motion. Because of the supply of air through inlet 13 for combustion, a small quantity (between 5% and 10%) of hot air for combustion is withdrawn and to adjust the corresponding hot gas quantitative streams, the throttling member 37 must be throttled in the tertiary air conduit 32.

In the event that the gas analyses reveal an increase in hazardous material, a partial gas withdrawal is made through the withdrawal line 40 of exhaust gas of the rotary kiln containing the hazardous material in a known manner.

The regulating devices described in the foregoing description, particularly the measuring and analysis apparatus 16 in the flue gas conduit 15, after the device 1 is set in operation through the regulating unit 45 and the throttling members 35, 36 and 39 controlled by it, maintain a constant progress of the combustion process of the waste material in the combustion chamber. According to the analysis of the gas composition in the flue gas, the automatic regulator 50 through operation of the throttling members 38, 38' may change the path of the exhaust gas or the point of introduction into the precalcinator may be changed over or reversed between the inlet points 41 or 41', respectively.

It will be evident that various modifications can be made to the described embodiments without departing from the scope of the present invention.

We claim as our invention:

1. A method for the removal of hazardous substances from hazardous and waste materials which comprises:
    providing a process for manufacturing cement clinker which includes the steps of preheating the cement raw material, calcining the preheated raw material in a precalciner, sintering the calcined raw material in a kiln following said precalciner, and cooling the clinker thus produced in a cooler,
    diverting heated air from the cooler of the cement making process according to the heat content of the substances to be burned at temperatures in the range from 600° C. to 950° C. to a furnace in which said hazardous and waste materials are combusted under conditions sufficient to achieve a combustion temperature and flue gas temperatures in said furnace of at least 1250° C., withdrawing and discharging a portion of the hot flue gas from said kiln by means of a bypass, the amount of said portion depending on the relative amounts of hazardous materials contained in said furnace flue gas,
    directing the hot flue gas from said furnace into the precalciner of said cement making process for supplying heat thereto, and
    adding to said hazardous and waste material a quantity of calcium containing carbonate carriers such that the CaO content of the calcination product is in the range of between 30% to 70% by weight.

2. A method for the removal of hazardous substances from hazardous and waste materials in accordance with the steps of claim 1:
    wherein the quantity of calcium containing carbonate carriers added to the waste material is such that the CaO content of the calcination product is in the range of between 40% and 50% by weight.

3. A method according to claim 1 wherein the combustion temperatures are between 1250° C. and 1500° C.

4. A method according to claim 1 wherein: said combustion is carried at temperatures between 1300° C. and 1400° C.

5. A method according to claim 1 which includes the step of adding at least a portion of the residue of the combustion process to the calcination material in the cement calcination installation and processing the same along with cement clinker.

6. A method according to claim 1 wherein said waste material is added to the furnace during gas shut-off of the inlet chamber of said furnace.

7. A method according to claim 1 which includes the step of blowing waste material into the hottest part of the cement calcination process by means of a carrier gas.

8. A method according to claim 1 which includes the steps of thermally decomposing the waste materials in a dry distillation process to produce a gas and a solid residue, burning said gas in the calcination zone, and passing said solid residue into the cement calcination furnace.

9. A method according to claim 1 which includes the step of melting the calcination product to produce a glassy condition.

10. A method according to claim 1 in which said furnace is a rotary kiln.

11. A method according to claim 1 which includes the step of adding a binder to the calcined product.

* * * * *